United States Patent
Iijima

(10) Patent No.: US 7,515,037 B2
(45) Date of Patent: Apr. 7, 2009

(54) REMOTE OPERATION SYSTEM WITH ENHANCED DOOR LOCK SECURITY OF VEHICLE

(75) Inventor: Kota Iijima, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 660 days.

(21) Appl. No.: 11/266,040

(22) Filed: Oct. 25, 2005

(65) Prior Publication Data

US 2006/0087404 A1    Apr. 27, 2006

(30) Foreign Application Priority Data

Oct. 26, 2004   (JP) .............................. 2004-311352

(51) Int. Cl.
  *B60R 25/10*   (2006.01)
  *B60C 23/00*   (2006.01)
  *B60C 23/02*   (2006.01)

(52) U.S. Cl. .............. 340/426.17; 340/442; 340/426.13

(58) Field of Classification Search ................. 340/426.13–426.17, 426.36, 442, 445–448, 340/5.61, 5.64, 5.72, 825.69, 825.72, 686.6; 307/10.1, 10.2, 10.5; 341/176

See application file for complete search history.

(56) References Cited

U.S. PATENT DOCUMENTS

| | | | | |
|---|---|---|---|---|
| 5,710,548 | A * | 1/1998 | LeMense | 340/825.69 |
| 5,920,278 | A * | 7/1999 | Tyler et al. | 342/33 |
| 6,647,773 | B2 * | 11/2003 | Nantz et al. | 73/146.5 |
| 6,861,942 | B1 * | 3/2005 | Knapp et al. | 340/2.8 |
| 7,102,498 | B2 * | 9/2006 | Desai et al. | 340/447 |
| 2005/0162259 | A1 * | 7/2005 | Hotta et al. | 340/426.13 |
| 2005/0195072 | A1 * | 9/2005 | Yamazaki | 340/442 |

FOREIGN PATENT DOCUMENTS

JP        05-1563664        6/1993

* cited by examiner

*Primary Examiner*—Benny Q Tieu
*Assistant Examiner*—Mark Rushing
(74) *Attorney, Agent, or Firm*—Brinks Hofer Gilson & Lione

(57) ABSTRACT

A remote operation system includes responders that detect the pressure of tires of a vehicle, an interrogator that is provided in a main body of the vehicle and communicates with the responders so as to process pressure data, a plurality of antennas that are provided in the vicinities of the tires, respectively, and are connected to the interrogator, and a portable transmitter for a remote operation that communicates with the interrogator and unlocks the doors of the vehicle. The interrogator has a reception intensity detector that detects an intensity of a received signal from the transmitter received by each antenna. When each antenna receives an unlock signal to be transmitted from the transmitter, a door closest to one of the antennas which receives a signal having the highest reception intensity is unlocked.

3 Claims, 2 Drawing Sheets

REMOTE OPERATION SYSTEM WITH ENHANCED DOOR LOCK SECURITY OF VEHICLE

BACKGROUND OF THE INVENTION

1. Field of the Invention

The present invention relates to a remote operation system for unlocking the doors of a vehicle.

2. Description of the Related Art

As shown in FIG. 4, a remote operation system according to the related art has a portable transmitter 1, and a receiver 3 and a moving mechanism 4 mounted on a vehicle 2. When an automatic operation mode button C of the transmitter 1 is pressed, a signal is periodically outputted from the transmitter 1. When the transmitter 1 enters an automatic operation mode region, the receiver 3 receives the signal, and then the doors of the vehicle 2 are unlocked. Further, when the transmitter 1 is moved outside the automatic operation mode region, the receiver 3 does not receive the signal periodically outputted from the transmitter 1, and thus the doors are locked.

Here, one or several signals to be transmitted first when the instruction button C is pressed have high output intensity. Accordingly, even when the instruction button C of the transmitter 1 is pressed at a position outside the automatic operation mode region, the signal to be transmitted first is received by the receiver 3, and thus the receiver 3 enters a state capable of receiving the automatic operation mode. Then, when the transmitted signal is not received by the receiver 3, the door lock operation is performed (for example, see JP-A-5-153664 (FIG. 1)).

Since the receiver does not have a function of discriminating the position of the transmitter, when the receiver receives the signal from the transmitter, all doors are unlocked. For this reason, the door of the vehicle on a side where a person is not riding is also unlocked, which causes a problem in security.

SUMMARY OF THE INVENTION

The invention has been made in consideration of the above-described problems, and it is an object of the invention to unlock a door closest to a position of a transmitter by use of a tire pressure monitoring device, thereby enhancing security.

In order to solve the above-described problem, according to an aspect of the invention, a remote operation system includes responders that are provided to correspond to tires of a vehicle and detect the pressure of the tires, an interrogator that is provided in a main body of the vehicle and communicates with the responders so as to process pressure data, a plurality of antennas that are provided in the main body of the vehicle in the vicinities of the tires, respectively and are connected to the interrogator, and a portable transmitter for a remote operation that communicates with the interrogator and unlocks doors of the vehicle. The interrogator has a reception intensity detector that detects an intensity of a received signal from the transmitter received by each antenna. In addition, when each antenna receives an unlock signal to be transmitted from the transmitter, a door closest to one of the antennas which receives a signal having the highest reception intensity is unlocked.

Further, in the remote operation system according to the aspect of the invention, when a signal intensity of the signal having the highest reception intensity is equal to or more than a predetermined value, the door may be unlocked.

Further, in the remote operation system according to the aspect of the invention, the transmitter and the interrogator may communicate with each other in an ID confirmation mode and in an unlock mode subsequent to the ID confirmation mode, and the interrogator may unlock the door after confirming an ID of the transmitter.

Further, in the remote operation system according to the aspect of the invention, the interrogator may have a synchronous detector and a first carrier oscillator, and the transmitter may have a second carrier oscillator, a modulated signal oscillator, a modulator, and a battery that drives the second carrier oscillator and the modulated signal oscillator. Here, the first carrier oscillator and the second carrier oscillator may output carriers having the same frequency. In the ID confirmation mode, the second carrier oscillator and the modulated signal oscillator may be driven by the battery, and a modulated wave on which an ID recognition signal is superimposed may be generated by the modulator and transmitted to the interrogator. In addition, in the unlock mode, only the modulated signal oscillator may be driven by the battery, a signal for modulation may be transmitted from the transmitter and inputted to the synchronous detector, and the interrogator may input the carrier from the first carrier oscillator to the synchronous detector.

Further, in the remote operation system according to the aspect of the invention, the interrogator may have a directional broad-band antenna that receives the modulated wave in the ID confirmation mode.

DESCRIPTION OF THE PREFERRED EMBODIMENT

Figure 1:
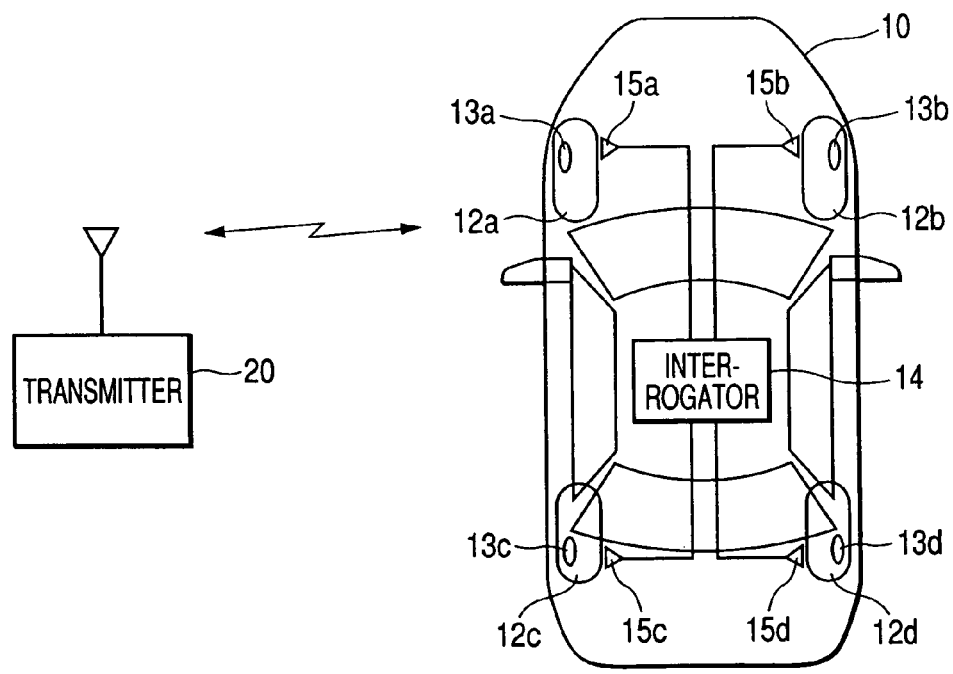
FIG. 1 is a diagram showing an overall configuration of a remote operation system according to the invention.
Figure 2:
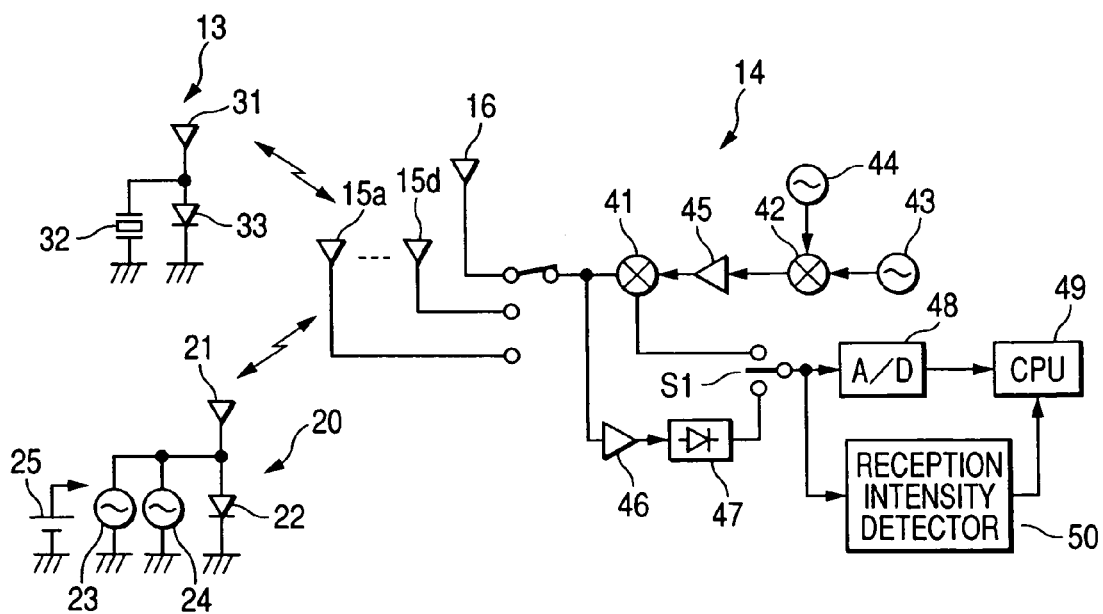
FIG. 2 is a block diagram showing a configuration of the remote operation system according to the invention.
Figure 3:
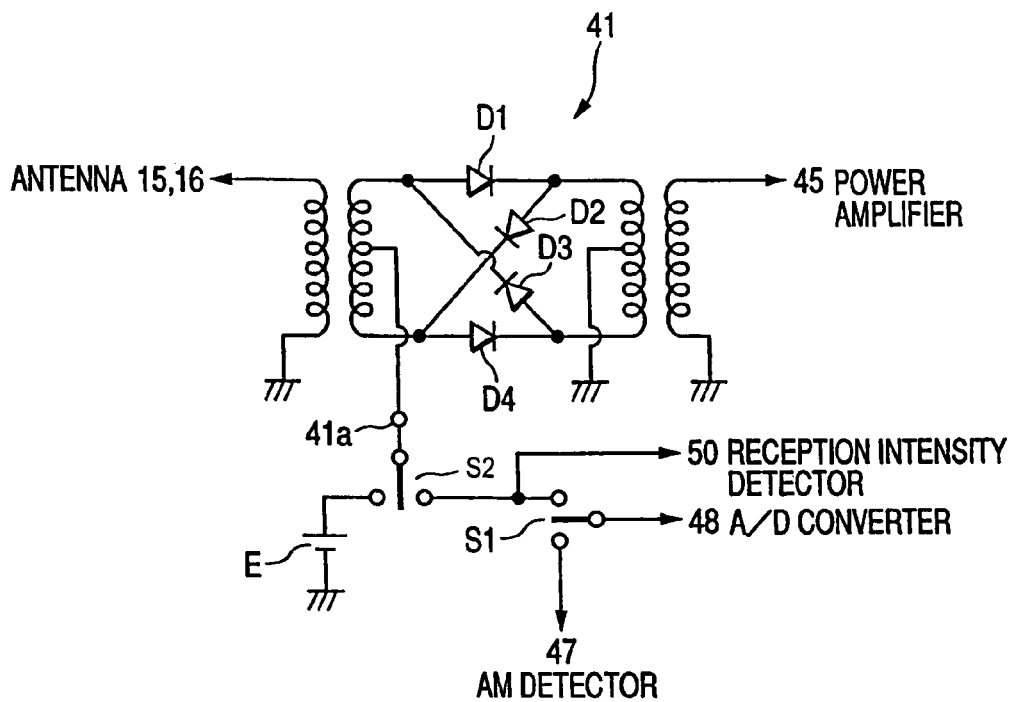
FIG. 3 is a circuit diagram showing an embodiment of a synchronous detector, which is used for the remote operation system according to the invention.
Figure 4:
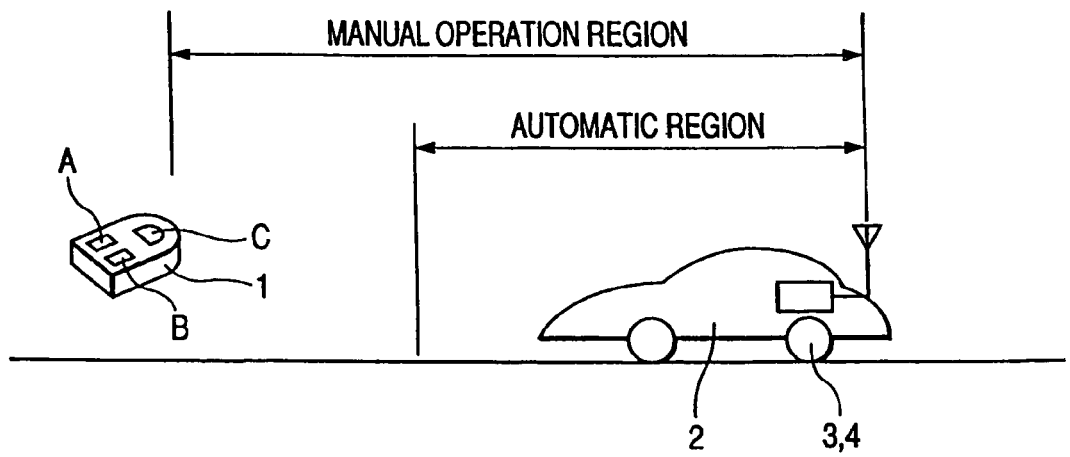
FIG. 4 is a diagram showing an overall configuration of a remote operation system according to the related art.

As apparent from the description with reference to FIGS. 1 to 3, a remote operation system of the invention has a feature in that a tire pressure monitoring system for monitoring the pressure of tires mounted on a vehicle is used.

Referring to FIG. 1, responders 13 (13a to 13d) are attached to tires 12 (12a to 12d) mounted on a vehicle 10, respectively. The responders 13 have the same configuration. A main body of the vehicle 10 has an interrogator 14. The interrogator 14 is connected to antennas 15 (15a to 15d), which are correspondingly provided in the vicinities of the tires 12a to 12d. The antennas 15a to 15d are periodically and sequentially switched by a unit (not shown) so as to be coupled to the interrogator 14. The responders 13 and the interrogator 14 constitute a tire pressure monitoring system. The remote operation system of the invention further uses a transmitter 20 for a remote operation.

FIG. 2 shows the overall circuit configuration. Each responder 13 has an antenna 31, and a sensor 32 and a modulating/demodulating diode 33 connected to the antenna 31. As the sensor 32, a quartz vibrator or the like, a self-resonant frequency of which changes corresponding to the pressure of the tire 12, is used.

Further, the interrogator 14 has a synchronous detector 41 that is connected to the antennas 15, a modulator 42, a first carrier oscillator 43 and a modulated signal oscillator 44 that are connected to the modulator 42, a power amplifier 45 that is provided between the synchronous detector 41 and the modulator 42, a receiving amplifier 46 that is connected to the antennas 15, an AM detector 47 that is connected to an output side of the receiving amplifier 46, an A/D converter 48 that converts an analog signal to a digital signal, a CPU 49 that processes the digital signal and controls the entire operation, and a reception intensity detector 50. The A/D converter 48 is connected to the synchronous detector 41 or the AM detector 47 by a first switch S1. The reception intensity detector 50 is connected to the synchronous detector 41. Further, a directional broad-band antenna 16 is also provided in parallel with the antennas 15 and is connected to the synchronous detector 41 and the receiving amplifier 46 by switching. The antenna 16 is provided at a position where there is a good view, for example, on the roof of the vehicle.

Here, the synchronous detector 41 has, for example, a known double balance mixer using diodes D1 to D4, or the like, as shown in FIG. 3. A detection output terminal 41a of the synchronous detector 41 is connected to a DC bias power supply E or the first switch S1 by a second switch S2.

Further, the transmitter 20 has an antenna 21, a detecting/modulating diode 22 that is connected to the antenna 21, a second carrier oscillator 23, a modulated signal oscillator 24, and a battery 25 that supplies power to the second carrier oscillator 23 and the modulated signal oscillator 24.

Of the above-described configuration, the receiving amplifier 46, the AM detector 47 that is connected to the output side of the receiving amplifier 46, and the reception intensity detector 50 are used not at the time of monitoring the tire pressure, but at the time of the remote operation. Therefore, at the time of monitoring tire pressure, the A/D converter 48 is constantly connected to the synchronous detector 41 by the first switch S1.

Next, the operation at the time of monitoring the tire pressure will be briefly described. The interrogator 14 outputs an AM modulated wave in an initial transmission period and outputs only a carrier in a reception period subsequent to the transmission period. In the transmission period, a carrier (2.4 GHz) from the first carrier oscillator 43 and a modulated signal (10 MHz) from the modulated signal oscillator 44 are inputted to the modulator 42. In the reception period, only the carrier is inputted to the modulator 42. During the transmission period and in the middle of the reception period, DC bias power E is applied to the detection output terminal 41a of the synchronous detector 41 by the second switch S2, and thus two diodes D1 and D3 are electrically connected to each other. After the middle of the reception period, the detection output terminal 41a is connected to the first switch S1. Therefore, during the transmission period and in the middle of the reception period, the AM modulated wave and the carrier outputted from the modulator 42 pass through the synchronous detector 41 and is emitted from the antennas 15. The AM modulated wave and the carrier also are emitted from the antenna 16, but the modulated wave and the carrier emitted from the antenna 16 have no relation to monitoring of the tire pressure. After the middle of the reception period, only the carrier is inputted to the synchronous detector 41.

In each responder 13, when the antenna 31 receives the AM modulated wave transmitted from the interrogator 14 in the transmission period, the AM modulated wave is AM-detected by the diode 33 and the sensor 32 is excited by the detected signal (10 MHz). The sensor 32 vibrates at a self-resonant frequency (about 10 MHz). The self-resonant frequency is set to a value corresponding to the pressure of the tire 12. Accordingly, the self-resonant frequency represents the tire pressure.

Next, in the reception period, the carrier to be transmitted to the responder 31 is inputted to the diode 33 in the middle of the reception period, and thus the carrier is AM-modulated by the signal having the self-resonant frequency of the sensor 32. The AM modulated wave is transmitted from the antenna 31 to the antennas 15 of the vehicle 10 and then is again inputted to the synchronous detector 41. After the middle of the reception period, since a DC bias voltage is not applied to the detection output terminal 41a of the synchronous detector 41 and at this time, only the carrier is inputted from the power amplifier 45 to the synchronous detector 41, in which the AM modulated wave is synchronously detected. The detected signal (about 10 MHz) is inputted to the A/D converter 48 via the second switch S2 and the first switch S1, and digital-converted pressure data is processed by the CPU 49 and then is displayed on a display device or the like (not shown).

Next, the operation of the remote operation system according to the invention for unlocking the doors of the vehicle will be described. In a state in which the vehicle 10 is stopped, the AM detector 47 is connected to the A/D converter 48 by the first switch S1.

In this state, when an operator operates the transmitter 20 in order to unlock the door, at an initial step (in an ID comparison step), power is supplied from the battery 25 to the second carrier oscillator 23 and the modulated signal oscillator 24. The second carrier oscillator 23 oscillates at a frequency of 2.4 MHz and the modulated signal oscillator 24 oscillates at a frequency of 10 MHz, such that the carrier and modulated signal are inputted to the diode 22. The AM modulated wave outputted from the diode 22 is emitted from the antenna 21. An ID for recognition is superimposed on the AM modulated wave.

The AM modulated wave emitted from the antenna 21 is received by the antenna 16 of the interrogator 14. The AM modulated wave also is received by the antennas 15. In this case, an electric field intensity of the AM modulated wave received by the antenna 16, which is disposed at the position where there is a good view, is higher. The received AM modulated wave is inputted to the AM detector 47 via the receiving amplifier 46 to be detected. When the detected signal is digital-converted by the A/D converter 48 and the ID is confirmed by the CPU 49, only the carrier is inputted from the first carrier oscillator 43 to the modulator 42, and at the same time, the DC bias voltage E is applied to the detection output terminal 41a of the synchronous detector 41 by the second switch S2. Therefore, only the carrier is transmitted from the interrogator 14 and the carrier is inputted to the diode 22 of the transmitter 20.

Next, at a door unlocking step, in the transmitter 20, the power supply to the second carrier oscillator 23 automatically stops in order to prevent unnecessary consumption of the battery 25, and thus only the modulated signal from the modulated signal oscillator 24 is inputted to the diode 22. Therefore, the carrier from the interrogator 14 is AM-modulated by the modulated signal from the modulated signal oscillator 24. The AM modulated wave is emitted from the antenna 21 and is received by the antennas 15 and 16 of the interrogator 14. The received AM modulated wave is inputted to the synchronous detector 41. At this step, the detection output terminal 41a of the synchronous detector 41 is connected to the first switch S1 by the second switch S2 and the A/D converter 48 is connected to the detection output terminal 41a of the synchronous detector 41 by the first switch S1. Therefore, the AM modulated wave from the transmitter 20 and the carrier from the first carrier oscillator 43 are inputted to the synchronous detector 41 and are synchronously detected by the synchronous detector 41. The detected signal is inputted to the A/D converter 48 and the reception intensity detector 50.

The reception intensity detector 50 inputs reception intensities of the antennas 15a to 15d to the CPU 49. The CPU 49 compares the reception intensities with each other and outputs an unlock signal to an unlocking mechanism (not shown) so as to unlock the door closest to one of the antennas, the reception intensity of which is the highest. Therefore, when the operator operates the transmitter 20 at the position close to the vehicle in order to unlock the door, the antenna closest to the position has the highest reception intensity, and thus the door closest to the antenna is unlocked, but other doors are not unlocked, thereby enhancing security.

In addition, when the CPU 49 is constituted to output the unlock signal to the unlocking mechanism only in a case in which the reception intensity is equal to or more than a predetermined value, the door can be unlocked when the transmitter is operated at the position close to the door, thereby further enhancing security.

According to the invention, the interrogator has the reception intensity detector that detects the intensity of the unlock signal from the transmitter received by each antenna. Further, when each antenna receives the unlock signal to be transmitted from the transmitter, the door closest to one of the antennas which receives the signal having the highest reception intensity is unlocked. At this time, other doors are maintained to be locked. Therefore, security is enhanced.

Further, according to the invention, when the signal intensity of the signal having the highest reception intensity is equal to or more than the predetermined value, the door is unlocked. Therefore, the door is unlocked when the transmitter is operated at a position close to the door, thereby enhancing security.

Further, according to the invention, the transmitter and the interrogator communicate with each other in the ID confirmation mode and in the unlock mode subsequent to the ID confirmation mode, and the interrogator unlocks the door after confirming the ID of the transmitter. Therefore, there is no case in which the door is unlocked by other transmitters.

Further, according to the invention, in the ID confirmation mode, the second carrier oscillator and the modulated signal oscillator are driven by the battery, and the modulated wave on which the ID identification signal is superimposed is generated by the modulator and transmitted to the interrogator. In addition, in the unlock mode, only the modulated signal oscillator is driven by the battery, the signal for modulation is transmitted from the transmitted and inputted to the synchronous detector, and the interrogator inputs the carrier from the first carrier oscillator to the synchronous detector. Therefore, power consumption of the transmitter can be reduced.

Further, according to the invention, the interrogator has the directional broad-band antenna that receives the modulated wave in the ID confirmation mode. Therefore, even when the transmitter is operated at a position distant from the vehicle, the ID can be confirmed.

The invention claimed is:

1. A remote operation system comprising:
responders that are provided to correspond to tires of a vehicle and detect a pressure of the tires;
an interrogator that is provided in a main body of the vehicle and communicates with the responders so as to process pressure data, wherein the interrogator further comprises a synchronous detector and a first carrier oscillator;
a plurality of antennas that are provided in a main body of the vehicle in a vicinities of the tires, respectively, and are connected to the interrogator;
a portable transmitter for a remote operation that communicates with the interrogator and unlocks doors of the vehicle, wherein the transmitter further comprises a second carrier oscillator, a modulated signal oscillator, a modulator, and a battery that drives the second carrier oscillator and the modulated signal oscillator;
wherein the transmitter and the interrogator communicate with each other in an ID confirmation mode and in an unlock mode subsequent to the ID confirmation mode, and the interrogator unlocks the door after confirming an ID of the transmitter;
wherein the first carrier oscillator and the second carrier oscillator output carriers having the same frequency,
in the ID confirmation mode, the second carrier oscillator and the modulated signal oscillator are driven by the battery, and a modulated wave on which an ID recognition signal is superimposed is generated by the modulator and transmitted to the interrogator, and
in the unlock mode, only the modulated signal oscillator is driven by the battery, and the carrier from the interrogator is modulated by the modulated signal from the modulated signal oscillator, a signal for modulation is transmitted from the transmitter and inputted to the synchronous detector, and the interrogator inputs the carrier from the first carrier oscillator to the synchronous detector; and
wherein the interrogator has a reception intensity detector that detects an intensity of a received signal from the transmitter received by each antenna, and when each antenna receives an unlock signal to be transmitted from the transmitter, a door closest to one of the antennas which receives a signal having the highest reception intensity is unlocked.

2. The remote operation system according to claim 1, wherein, when the signal intensity of the signal having the highest reception intensity is equal to or greater than a predetermined value, the door is unlocked.

3. The remote operation system according to claim 1, wherein the interrogator has a directional broad-band antenna that receives the modulated wave in the ID confirmation mode.

* * * * *